United States Patent
Pearce

[11] Patent Number: 5,832,872
[45] Date of Patent: Nov. 10, 1998

[54] ANIMAL FEEDING BOWL

[76] Inventor: Woodrow W. Pearce, 1601 Puebla Dr., Glendale, Calif. 91207

[21] Appl. No.: 862,851

[22] Filed: May 23, 1997

[51] Int. Cl.⁶ .............................. A01K 5/01; A01K 39/01
[52] U.S. Cl. ............................................ 119/477; 248/214
[58] Field of Search .................................. 119/72.5, 454, 119/456, 477; 248/214

[56] References Cited

U.S. PATENT DOCUMENTS

| | | | |
|---|---|---|---|
| 353,518 | 12/1886 | Cautereels et al. ...................... | D7/560 |
| 1,718,432 | 6/1929 | Qualmann . | |
| 1,879,332 | 9/1932 | Kulp . | |
| 1,909,244 | 5/1933 | Ahlman . | |
| 4,148,155 | 4/1979 | Allen ..................................... | 119/77 X |
| 4,541,363 | 9/1985 | Paoluccio .................................. | 119/77 |
| 4,697,775 | 10/1987 | Wille .................................. | 248/214 X |
| 4,762,086 | 8/1988 | Atchley ................................. | 119/77 X |
| 5,072,903 | 12/1991 | Griffin ...................................... | 248/72 |
| 5,228,411 | 7/1993 | O'Rourke . | |
| 5,284,173 | 2/1994 | Graves et al. ............................... | 137/1 |
| 5,467,733 | 11/1995 | Messina .................................. | 119/464 |
| 5,676,091 | 10/1997 | Pennington et al. ..................... | 119/477 |

FOREIGN PATENT DOCUMENTS

| | | |
|---|---|---|
| 658570 | 8/1982 | United Kingdom . |
| 2113519 | 8/1983 | United Kingdom . |

*Primary Examiner*—Robert P. Swiatek
*Attorney, Agent, or Firm*—Christie, Parker & Hale, LLP

[57] ABSTRACT

A self attaching, rugged animal feeding bowl for use in cages, kennels, compounds, and/or animal transportation containers. The bowl is constructed of a rigid hard surfaced polymer. The material used is molded with a heavy wall thickness which greatly reduces the possibility that an animal will be able to penetrate the surface with teeth, claws, bills or beaks thus reducing the risk of destruction of the bowl and harm to the animal. The bowl has an attachment apparatus either integrally molded with or secured to the bowl sidewall. The attachment apparatus includes one or more slots for receiving wires of an animal enclosure. The attachment member includes a male/female coupling which sandwiches the wires of the enclosure between the male/female members when the coupling is engaged. Ribs including a center rib support and reinforce the attachment apparatus as it is secured to the bowl.

16 Claims, 6 Drawing Sheets

ANIMAL FEEDING BOWL

REFERENCE TO RELATED APPLICATION

The present application is related to a design patent application, application Ser. No. 29/056,629, filed Jul. 3, 1996 entitled Animal Feeding Bowl and now U.S. Pat. No. D383,252.

BACKGROUND OF THE INVENTION

The present invention relates to an animal feeding/watering bowl and more specifically to a self attaching mounting apparatus for securing the bowl to the wires of an enclosure housing an animal or bird.

Feeding bowls are standard equipment for bird cages and other animal enclosures and are constructed of numerous materials and in a wide variety of configurations. In recent years, plastic bowls have become very popular as the material of choice for bird cages and other animal cages because it is an easily moldable material that can be designed to provide a rugged construction with tailored surfaces for enabling the animals to comfortably perch on the rim or elsewhere. Such plastic bowls, however, dictate that they be made of certain types of plastic so as to make them resistant to wear and tear induced by the animals. Many of the currently available plastic bowls are constructed of materials that are easily scratched or marred by the teeth, claws or beaks of the animals that are using them, thereby subjecting them to a rapid deterioration and the need for replacement. In addition, the choice of some plastic materials and their subsequent degradation in use can result in sharp edges or other damage that can cause harm to the animal.

A second problem with conventional feeding bowls is the issue of satisfactorily attaching the bowl to the interior of the enclosure in which the bowl is being mounted. Currently, feeding bowls utilize a number of different designs and mechanisms for attaching bowls to the side of a cage. Such mechanisms are usually designed so as to engage two or more of the vertical wires comprising the cage. These attachments are sometimes separate and independent from the bowl itself and in other cases comprise a number of individual components for attaching the bowl to the cage. In either event, the fact that the mounting piece is not an integral part of the bowl adds to the inconvenience and clumsiness of the mounting and securing the bowl in position.

Thus, while plastic bowls are extremely popular for use as animal feeding receptacles, they have significant draw-backs in their utilization and in some cases can present a safety hazard to the animals that are using them.

It is highly desirable to provide an animal feeding bowl which is rigid, heavy walled, hard surfaced and can be easily molded. In addition, a bowl with a mounting attachment that is integrally formed or incorporated into the bowl and which is itself rugged, uses a minimum of parts and is conveniently attachable to the wires of a cage is likewise highly desirable. The animal feeding bowl in the present invention satisfies these requirements.

SUMMARY OF THE INVENTION

The present invention provides a rigid, self attaching feeding bowl for animals in a caged or restricted environment. The bowl is easily attached to the cage via a integral attachment device. The attachment device is comprised of a male threaded member having a slot through the center thereof and a wide base flange. The bowl is placed in the interior of the cage with the attachment member facing toward the exterior of the cage. The male member is designed to either be inserted through the space between two adjacent bars or wires of a cage or is inserted with the slot straddling a single wire such that the threaded portion extends exteriorly of the cage. When inserted between two wires the base flange is caused to seat or bear against the two adjacent cage wires. The male member and the bowl to which it is attached is secured in place by utilizing a female member that is screw threaded onto the threaded male member and tightened so as to secure the pair of adjacent wires against the wide base flange with a similarly sized flange on the female member facing the male member. Similarly when the slot engages on a single wire, the female member is threaded onto and tightened until the flanges of the male and female members securely grip the single wire as it is seated in the bottom of the slot.

Because of its unique fastening method the bowl of this invention can be used in a greater number of restraining enclosures such as cages, kennels, compounds, and animal transportation restraining enclosures. An additional feature is the incorporation of a wide hemispherical top rim that is designed as a perch for feeding or drinking birds.

The present invention has a number of advantages including the ability to use it in a wide variety of enclosures. These include cages, kennels, compounds and animal transportation apparatus. A further design feature of the bowl is the provision of a rim that is circular in cross section and can be made of varying diameters depending upon the size of the animal with which the bowl is intended to be used. This rim provides a perch for birds who are utilizing the bowl and likewise can provide a foothold for larger animals as well. Other features include provision of a collar or ring molding at the base of the bowl to allow the bowls to be stacked for shipping.

The present invention satisfies the need for securing feeding bowls to the lattice of a cage. The attachment device incorporated into the feeding bowl of the present invention enables the bowl to be easily attached and removed from the side of a cage and when mounted to securely fasten the bowl to the cage so that the bowl cannot be disturbed or dislodged by the animal. While the preferred shape of the bowl is round, other configurations including oblong and square bowls are also suitable alternatives.

DETAILED DESCRIPTION OF THE DRAWINGS

These and other aspects of the invention will be further illustrated by reference to the drawings wherein.

Figure 1:
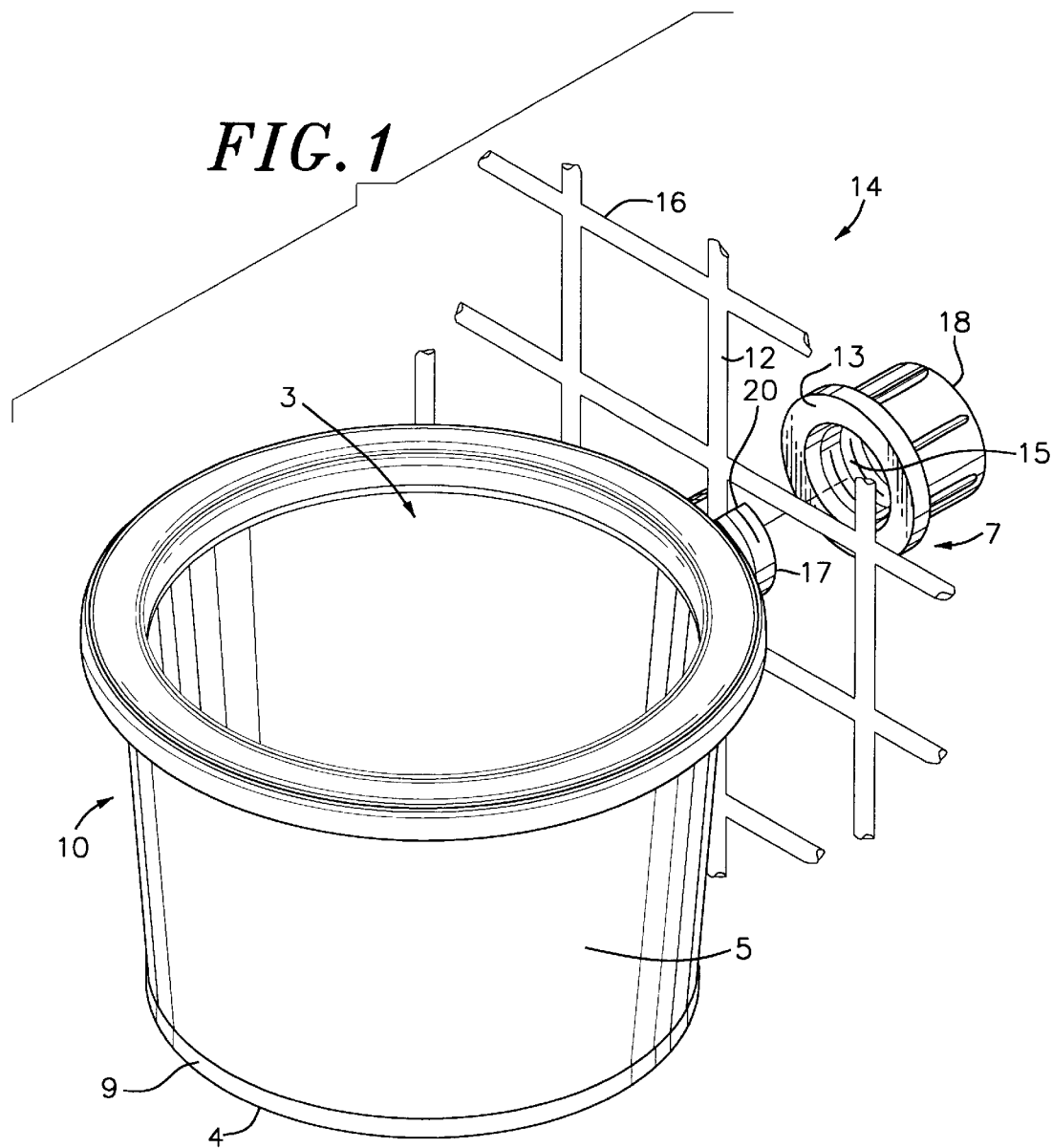
FIG. 1 is an exploded perspective view of the animal feeding bowl with attachment mechanism according to the present invention as it is about to be attached to a wire lattice used in a cage or animal enclosure with a slot in a male mounting member for receiving a vertical wire of the cage and a female member about to be attached to the male member.

Referring now to FIG. 1 as shown therein, an animal feeding bowl 10 according to the present invention is attached to a vertical element 12 of a cage 14. The cage as shown in FIG. 1 consists of vertical elements or wires 12 and horizontal elements or wires 16. Bowl 10 has an open top 3, a closed bottom for 4 and is round in configuration having a cylindrical side wall 5. In one embodiment, an indented ring 9 is molded into the base of bowl 10 to facilitate stacking one bowl into another for shipping purposes and the like.

Figure 2:
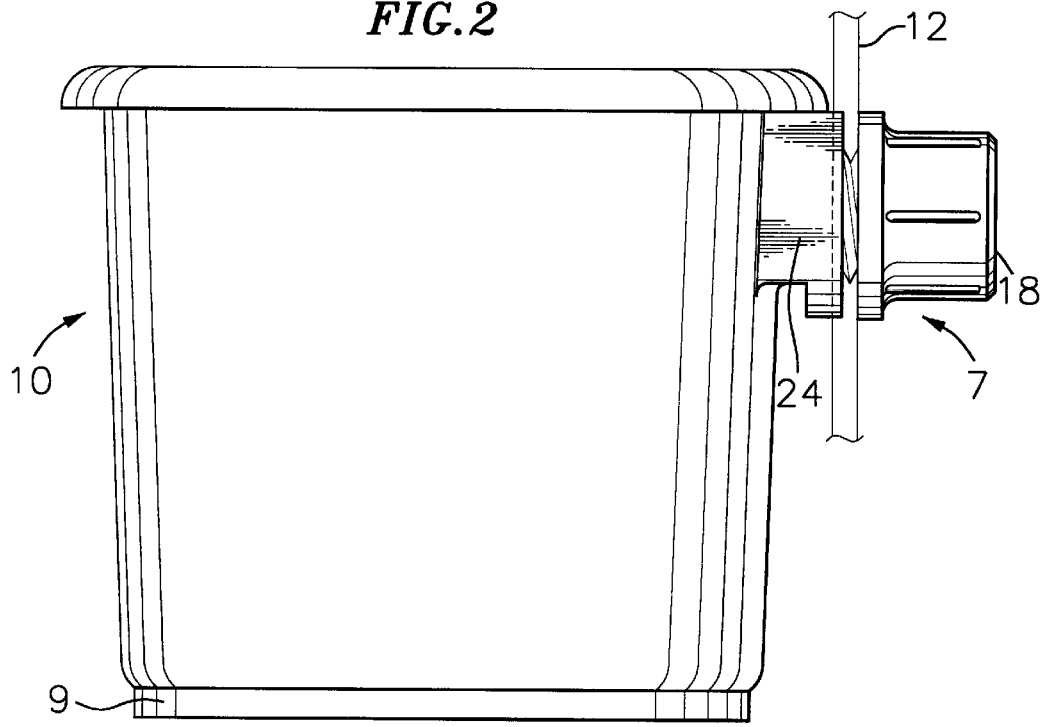
FIG. 2 is a side elevation view of the bowl according to the present invention showing the vertical wire in the slot and the bowl firmly secured to the wire.
Figure 3:
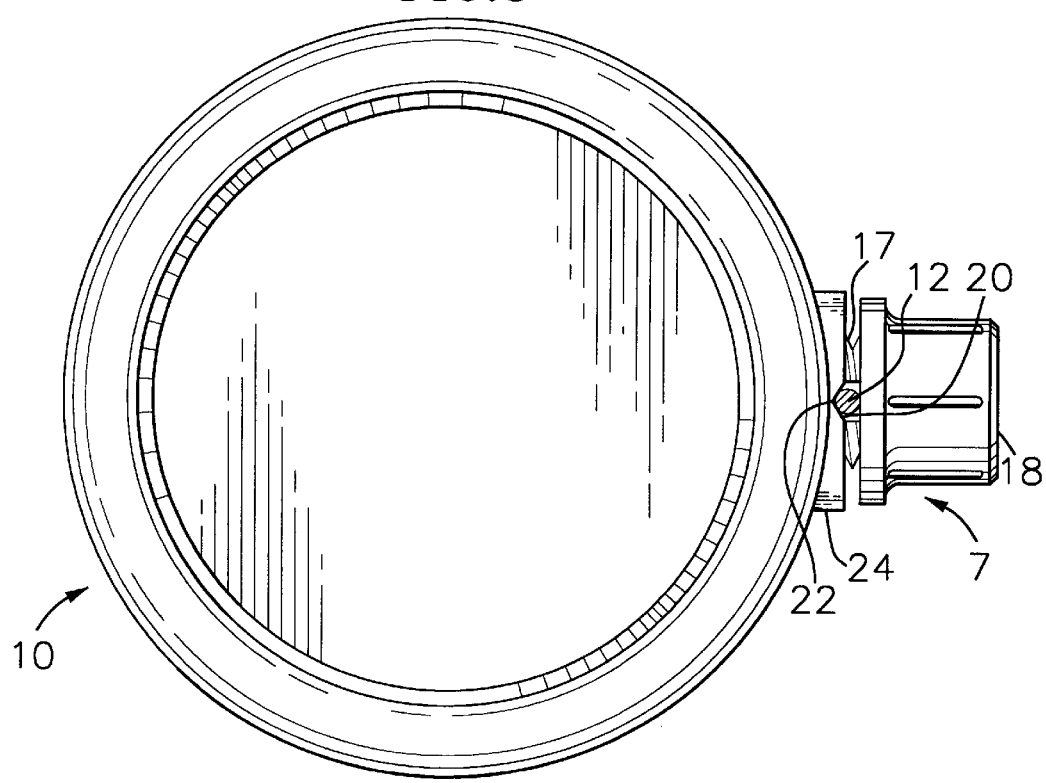
FIG. 3 is a top plan view of the feeding bowl of FIG. 2 showing the vertical wire in the slot.

Attached to the side wall 5 is an attachment mechanism 7 comprising a male member 17 and female member 18. As shown in FIG. 1 the bowl is attached to vertical wire 12. As can be seen in FIGS. 2 and 3, wire 12 extends through a slot 20 in the male member. The mounting mechanism shown in FIGS. 2 and 3 is shown in its secured position. The female member has a flange 13 circumscribing a threaded aperture 15 and is screw threaded and tightened onto the male member so that the wire is secured against the base of slot 20 in the male member and against the face of the flange of the abutting female member. The base 22 of slot 20 is V-shaped in cross-section to provide a secure seating position for wire 12. The male member is integrally molded into a base flange 24 which has a lateral dimension which is wider than the diameter of the male member to form a flange or shoulder and is secured to the side wall 5 of the dish. When the female member is screw threaded onto the male member and brought to bear against the wire 12, the facing flanges of the male member and the female member grasp and grip the wire holding the dish securely in place in cooperation with the slot in the male member.

Figure 5:
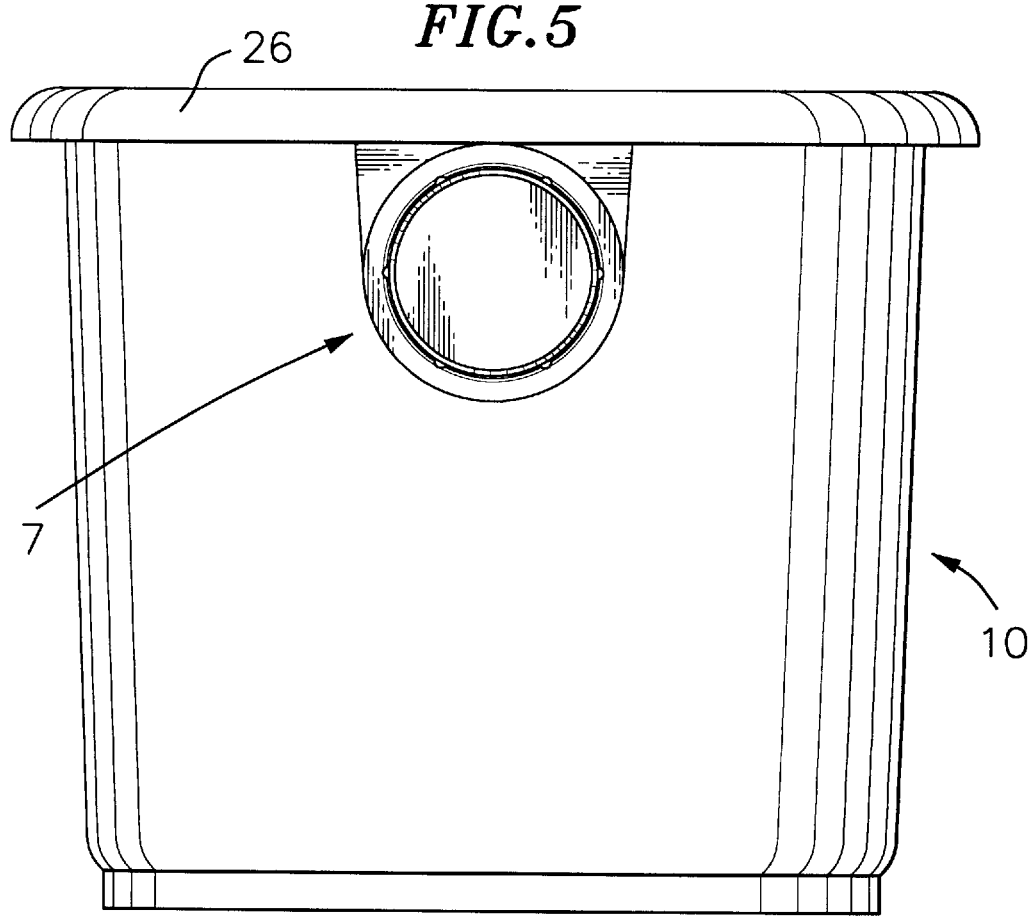
FIG. 5 is front elevation view of the feeding bowl with attachment mechanism.

An example of the bowl or dish according to the present invention before it is attached to the wires of an enclosure is shown in FIG. 5. As shown therein, FIG. 5 is a side elevation of the dish taken from the side on which the attaching mechanism is mounted. As shown therein, the bowl has a rounded upper lip 26 formed integrally at the top of sidewall 5 of bowl to provide a secure perch for animals such as birds and the like to stand on while feeding or taking water from the contents within the bowl.

Figure 6:
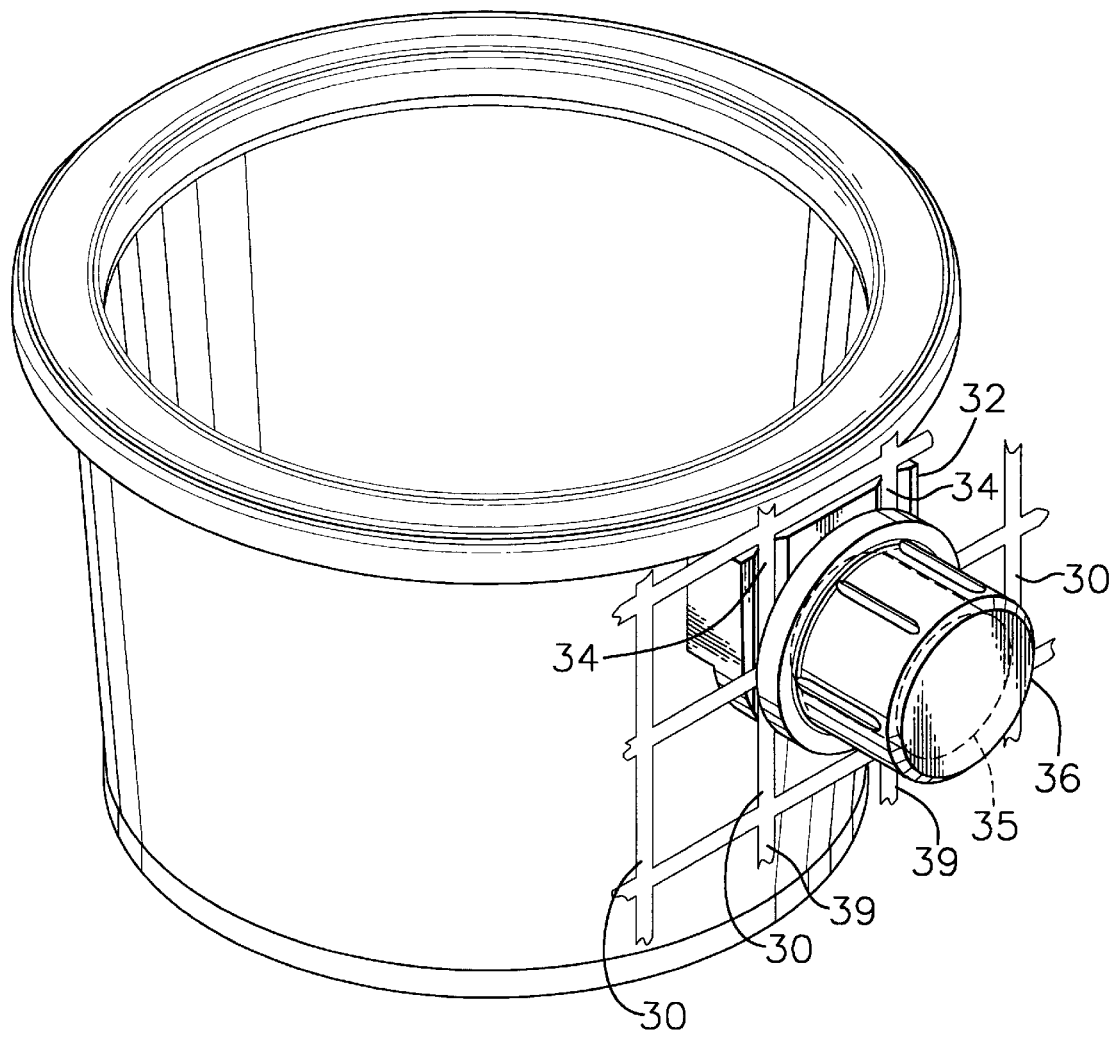
FIG. 6 is a perspective view of the feeding bowl according to the present invention showing an alternative mounting arrangement with the male member extending between adjacent wires of the animal enclosure.

An alternate embodiment of the invention is shown in FIG. 6 in perspective view with a male member 35 extending between two adjacent vertical wires 39 of an enclosure. The vertical wires of the enclosure are shown at 30. The base flange 32 of the male member 35 has a pair of v-shaped slots 34 formed at each side of member 35 to receive the vertical wires of the enclosure. As in embodiment shown in FIG. 1, a female member 36 is screw threaded onto male member 35 and tightened down against the wires to securely hold the bowl in position.

The diameter of the male member and the female member as well as the size of the bowl are a matter of choice depending upon the size of the animal for which the bowl is intended. The size of the bowl is scaled down for use in bird cages and with small animals and is proportionately increased in scale for use in feeding larger birds or animals. Likewise, the diameter of the male member can be increased or decreased depending on the spacing between the vertical or horizontal wires forming the enclosure.

Figure 4:
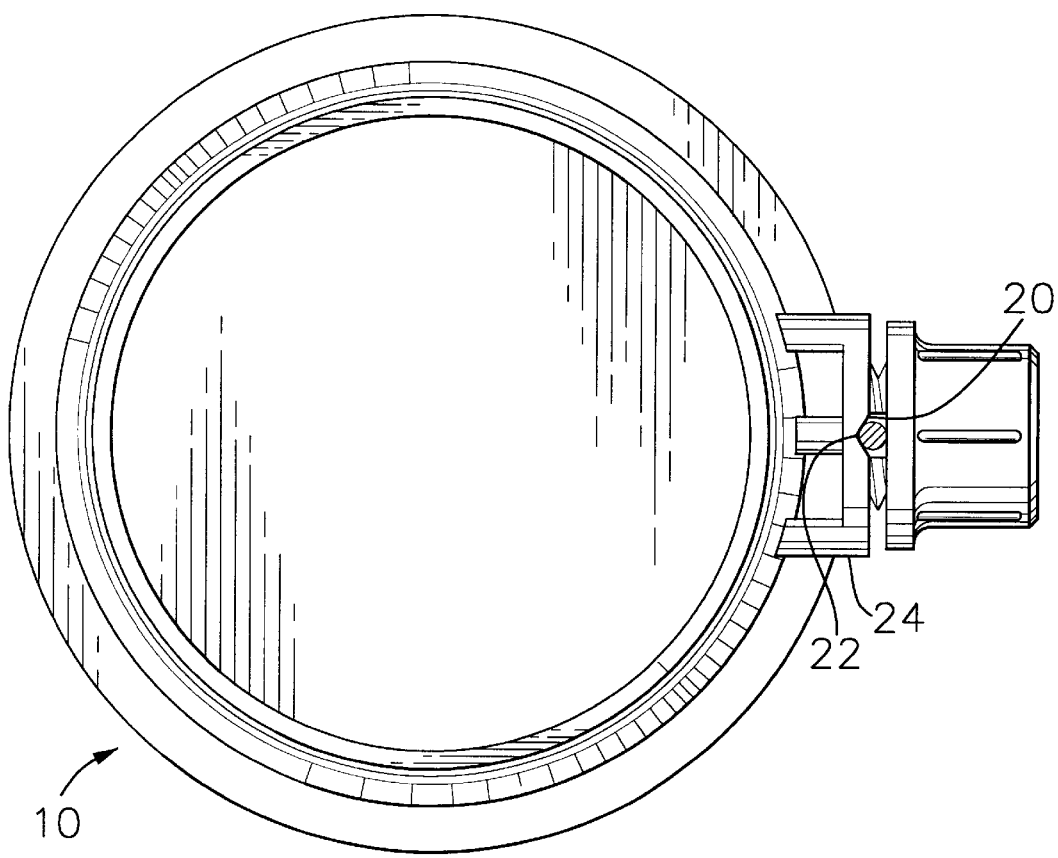
FIG. 4 is a bottom plan view of the feeding bowl and attachment mechanism.

As shown in FIGS. 3 and 4, the slot in the male member is shaped so as to define a V at the bottom of the slot. This provides a guide for seating the wire of an enclosure in the base of the slot to further secure and hold the feeding bowl in position. This V-shaped configuration of the slots applies to the various embodiments of the feeding bowl including the variation which the wire is located in a center slot of the male member as well as the embodiment where the slots are located in the base flange of the male member on either side of the threaded male member.

Figure 7A:
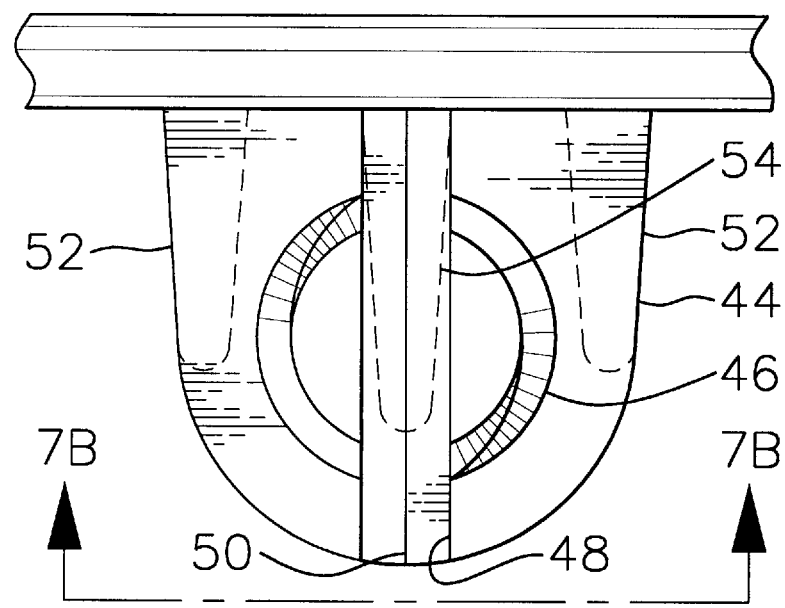
FIG. 7A is enlarged front elevation view of the attachment mechanism according to the present invention.
Figure 7B:
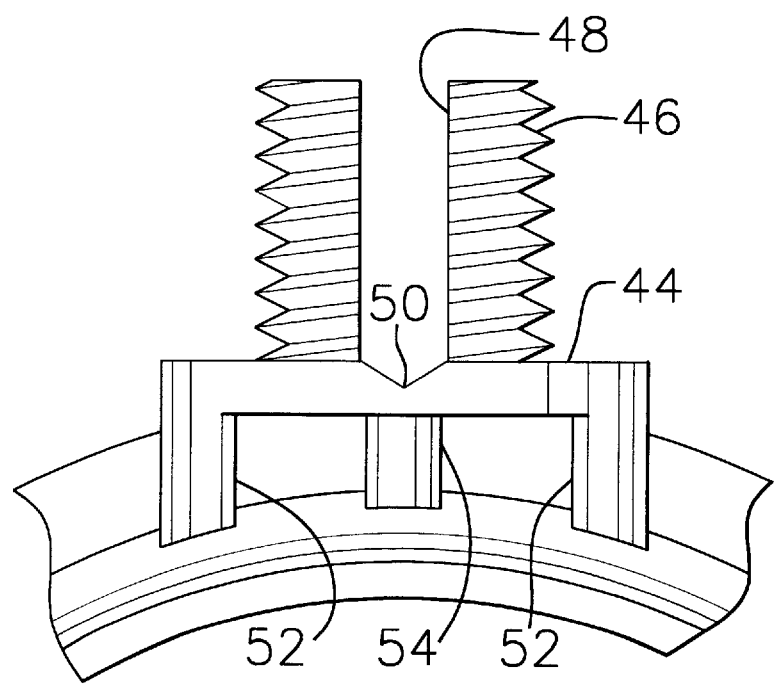
FIG. 7B is a bottom view of the attachment mechanism taken along lines 7B—7B of FIG. 7A.

A further detailed illustration of the mounting mechanism of the present invention is shown is FIGS. 7A and 7 B. In particular, shown in these figures is a presently preferred embodiment of a male mounting member according to the present invention as is shown in FIG. 7A, the male member comprises base flange 44 with a male member 46 projecting therefrom. The male member has a vertical slot 48 extending through the center of the male member 46. In other embodiments, a horizontal slot or slots are also suitable. The base of the slot is V-shaped as shown in FIG. 7B and as indicated by the center line 50 bisecting the slot. Base flange 44 is supported by two vertical side ribs 52 located at each side of flange 44 and extending between the underside of flange 44 and the side wall of the feeding bowl. A center rib 54 extends vertically beneath the center of flange 44 between the center flange and the sidewall of the bowl to a length which is slightly greater than the length of side ribs 52. Center rib 54 provides a base of support for the mounting mechanism and structurally reinforces the mounting slot 48 so that when the female member is tightened upon the male member and the wire of an enclosure is caused to bear against the bottom 50 of slot 48, rib 52 supports and reinforces the structure so as to obtain a secure mounting and prevent cracking or crazing of flange 44 under pressure from the closure and tightening of the female member upon the wire.

What is claimed is:

1. A mounting bracket for securing an object to a lattice having a plurality of vertical and horizontal elements comprising:

a male member connected at a fixed end to the object and having a threaded portion at the opposite end, said male member defining a first flange at the fixed end of the threaded portion and a diametrical slot extending through the threaded portion for receiving and engaging one of said vertical or horizontal elements wherein at least a portion of the slot is beveled;

means for reinforcing the structural integrity of said first flange; and a female member for threadedly engaging the threaded portion of the male member, said female member defining a second flange opposed to the male member flange, said male and female members being connectable such that the flange of said male member and the flange of said female member can engage and grip at least one of the horizontal or vertical elements on opposite sides thereof as said element is seated in the base of the slot to hold the object in position.

2. A bracket according to claim 1 wherein a portion of the slot is V-shaped.

3. A bracket according to claim 2 wherein the first flange has a lateral dimension greater than the width of the male member.

4. A bracket according to claim 3 wherein the bottom of the slot lies in the same plane as the plane of the first flange.

5. A bracket according to claim 1 wherein the second base of the slot is beveled.

6. A bracket according to claim 5 wherein the second flange has a lateral dimension greater than the width of the female member.

7. A mounting bracket for securing an object to a lattice having a plurality of vertical and horizontal elements comprising:

a male member connected at one end to the object and having a threaded portion at the opposite end, said male member defining a flange at the proximal end of the threaded portion and having a diametrical dimension smaller than the spacing between adjacent vertical or horizontal elements, rib means extending between the object and the male member flange for reinforcing the flange, and a female member for threadedly engaging the threaded portion of the male member, said female member defining a flange opposed to the male member flange, said male and female members being connectable with the threaded portion extending between two adjacent vertical or horizontal elements such that the flange of said male member and the flange of said female member can engage and grip the two adjacent horizontal or vertical elements on opposite sides thereof.

8. A feeding dish for use in an animal cage having a plurality of vertical and horizontal elements, the dish comprising:

a bowl and mounting means, said mounting means having a male member connected at one end to the dish and having a threaded portion at the opposite end, said male member defining a flange at the proximal end of the threaded portion and a diametrical slot extending through the threaded portion for receiving and engaging one of said vertical or horizontal members;

a plurality of ribs including a center rib located between the exterior of the bowl and the male member flange; and a female member for threadedly engaging the threaded portion of the male member, said female member defining a flange opposed to the male member flange, said male and female members being connectable such that the flange of said male member and the flange of said female member can engage and grip at least one of the horizontal or vertical elements or the male member passes between two adjacent horizontal or vertical members and the flanges engage the two adjacent horizontal or vertical members.

9. A dish according to claim 8 wherein the slot receives and engages one of said vertical or horizontal members and the flanges grip said vertical or horizontal member.

10. A dish according to claim 8 wherein the threaded portion of the male member has a lateral dimension which is smaller than the spacing between two adjacent vertical or horizontal members and said threaded portion is inserted between the two adjacent vertical or horizontal members such that the flanges grip the two members on opposite sides thereof.

11. A dish according to claim 8 wherein at least a portion of the slot has a V-shape.

12. A dish according to claim 8 wherein a portion of the slot is beveled.

13. A dish according to claim 8 wherein at least a portion of the slot is V-shaped.

14. A dish according to claim 8 wherein at least a portion of the slot is beveled.

15. A feeding dish for use in an animal cage having a plurality of vertical and horizontal elements, the dish comprising:

a bowl and mounting means, said mounting means having a male member connected at one end to the dish and having a threaded portion at the opposite end, said male member defining a flange at the proximal end of the threaded portion and a diametrical slot extending through the threaded portion for receiving and engaging one of said vertical or horizontal members; and a female member for threadedly engaging the threaded portion of the male member, said female member defining a flange opposed to the male member flange, said male and female members being connectable such that the flange of said male member and the flange of said female member can engage and grip at least one of the horizontal or vertical elements or the male member passes between two adjacent horizontal or vertical members and the flanges engage the two adjacent horizontal or vertical members.

16. A dish according to claim 15 wherein the slot receives and engages one of said vertical or horizontal members and the flanges grip said vertical or horizontal member.

* * * * *

UNITED STATES PATENT AND TRADEMARK OFFICE
CERTIFICATE OF CORRECTION

PATENT NO. : 5,832,872
DATED : November 10, 1998
INVENTOR(S) : Woodrow W. Pearce It is certified that error appears in the above-identified patent and that said Letters Patent is hereby corrected as shown below:

Abstract, line 1, replace "self attaching" with -- self-attaching --.
Abstract, line 15, delete "and".
Column 1, lines 13, 64, replace "self attaching" with -- self-attaching -- (both occurrences).
Column 1, line 66, replace "a integral" with -- an integral --.
Column 2, line 66, after "FIG. 5 is" insert -- a --.
Column 3, line 5, replace "is enlarged" with -- is an enlarged --.
Column 3, line 14, after "bottom" delete "for".
Column 3, line 53, replace "v-shaped" with -- V-shaped --.
Column 3, line 55, after "As in" insert -- the --.
Column 4, line 7, after "variation" insert -- in --.
Column 4, line 21, replace "center line" with -- centerline --.
Column 5, claim 5, lines 1-2, cancel claim 5.
Column 5, claim 6, line 3, replace "claim 5" with -- claim 1 --.

Signed and Sealed this

Eighteenth Day of January, 2000

Attest:

Q. TODD DICKINSON

*Attesting Officer*     *Commissioner of Patents and Trademarks*